June 20, 1972 G. E. ERB 3,671,126

NONCONTACTING OPTICAL PROBE

Filed Feb. 19, 1970

INVENTOR.
GILBERT E. ERB
BY Henry M. Bissell
ATTORNEY

United States Patent Office 3,671,126
Patented June 20, 1972

3,671,126
NONCONTACTING OPTICAL PROBE
Gilbert E. Erb, Los Angeles, Calif., assignor to Ati, Inc.
Filed Feb. 19, 1970, Ser. No. 12,574
Int. Cl. G01c 3/08
U.S. Cl. 356—4
14 Claims

ABSTRACT OF THE DISCLOSURE

A distance measuring device for deriving contour information without contacting the surface being measured and without the use of internal moving parts. The device utilizes an optical system and geometric triangulation techniques to develop electrical output signals which may be used to drive readout displays, numerically controlled machine tools or the like.

BACKGROUND OF THE INVENTION

(1) Field of the invention

This invention relates to contour reading systems, and more particularly, to such a system utilizing an optical detector which does not require contact with the surface being read.

(2) Description of the prior art

For a variety of uses, it is often desirable to be able to convert a given surface contour, which may be visually apparent, to a quantitative readout in the form of signals which may be stored in a computer and used in various processes under computer control or retrieved for later study and comparison. With the advent of sophisticated systems subject to computer control, such as numerically controlled machine tools, computer controlled graphical plotters and the like, the development of production line tooling has been greatly facilitated. However, the full capabilities of such systems have been restricted by limitations arising from the manner in which a given model can be reduced to quantitative information for computer storage. Where a particular model does not particularly comprise systematically defined surfaces, but instead comprises more or less randomly disposed points making up the surface contour, as for example in the case of a human model (the clothing field) or a design model which is to be mass produced in large quantities (e.g. the auto industry), the task of mapping the surface contours in a manner which permits ready reproducibility has not been satisfactorily solved heretofore. Attempts at a solution to the problem include a system known as an electronic surface recorder which has been employed in the auto industry to take contour information directly off the full size clay models which represent the design that is selected for production. One drawback with this system, however, has been the fact that it requires water on the surface of the clay model as a medium between the probe and the clay. This is somewhat messy and also may cause bulging or distortion of the model. Other contour recorders have required physical contact between the surface detector and the model with a possible undesirable interaction between the detector and the surface being measured. Another type of system employed a laser beam in a relatively cumbersome arrangement including a number of moving parts requiring critical adjustment and frequent maintenance in operation. Still another known system has relied on beam-splitting techniques with null balancing of the separated light channels. None has resulted in a workable system which is entirely satisfactory for the purpose. A workable non-contacting probe is perhaps the last element needed to be developed in order to perfect the complete automation of developing the production line tooling from a design model.

SUMMARY OF THE INVENTION

In brief, arrangements in accordance with the present invention comprise an optical system which operates to translate mechanical distance or motion into signals representing digital dimensions, by means of triangulation. A light source is focused onto a target from which dimensions are to be taken. Reflected light is collected by a receiver system which filters (if need be) and converges the light onto a silicon detector. The silicon detector is located off the focal point for systems where a wide dynamic range is desired, although for certain uses it may be positioned at the focal point. A particular bicell configuration is employed for the silicon detector so as to develop the capability of locating the center of the defocused light spot. At the zero position for the system probe, the spot center is located at the center of the bicell detector. Translation from the zero position is then measured linearly in accordance with changes in the light pattern at the detector. Associated electronic circuitry amplifies and processes the output from the silicon bicell detector to provide suitable digitized output signals in a preferred arrangement. However, if desired, analog signals may be developed.

One particular arrangement in accordance with the present invention utilizes a light source comprising an arc lamp within a light-tight box having an aperture to develop a small intense spot of light for projection. Other more sophisticated focusing systems may be employed if desired. The light source is placed along the projection optical axis. A projection lens collects the radiated light from the light source and focuses it at the zero-setting position of the target. The "stand-off" distance (the distance between a reference point of the probe and the target zero position) can be varied over a considerable range through the selection of lens and component orientation. Light is reflected along a receiver optical axis oriented at an angle to the projection optical axis. This light is gathered into a light-tight box by a receiver lens and passed through an optional optical filter, if appropriate, for imaging on a silicon bicell photo-detector. Such silicon photo-detector bicells are known in the art and are available from United Detector Technology, Santa Monica, California, among others. One type of bicell comprises a photovoltaic surface divided into two sections with electrical leads connected thereto. In this manner the bicell is enabled to provide a comparison of the light imaged on its two sections. Alternatively a photoconductor or photo-emissive bicell may be used, although the photovoltaic type offers better linearity.

Translatory motion of the target either toward or away from the transmitter lens results in motion of the received spot across the bicell. A signal proportional to the motion is thus generated when the bicell outputs are differenced. Inherent scale factor changes due to variations in target material, target angle, and target motion are automatically compensated for in an associated data processing electronics unit. A zirconium concentrated arc lamp is utilized to provide a suitably small spot size (.007") which performs satisfactorily in this application.

In one particular arrangement in accordance with the invention, high-pass optical filtering is employed in the light receiver to eliminate associated background noise, thus admitting the reflected arc radiation while blocking out ambient light which might otherwise interfere with the true signal developed by the detector.

In particular arrangements in accordance with the invention, the optical probe may be positioned on a traversing system including a table or mount which is controlled in space relative to a model or other contour surface which is to be mapped. Typically, the probe is oriented so that its projection axis is aligned with the Z coordinate axis. Variable electrical output signals are developed in accordance with variations in the distance between the probe and the target. Motion of the table in the X and Y directions with recording of the X and Y movements together with the output signals (Z dimension) from the probe provides a contour of the target surface in a form which may be stored by a computer or utilized to drive a printer, a drafting machine, a numerically controlled machine tool or the like. Alternatively the probe may drive a servomechanism controlling the Z position with the electromechanical readout of the Z coordinate. A null indicator and deadband light may also be included for operating information.

Systems embodying the present invention have a wide variety of potential uses. In the automobile industry years of work are typically required before a complete new body style can be mass produced. Much of this time is consumed in taking measurements necessary to prepare templates or tooling which conform to a design model. With the present invention, the necessary data for an entire car body can be obtained in a matter of days. Similar improvements can be realized in the measurement of shoe lasts, and the production of aircraft, ships and other vehicles. The invention may be similarly used in the mannequin and apparel industry to take three-dimensional measurements from human models of different sizes and in different positions, not only saving considerable tedious, time-consuming work, but permitting complete automation of the entire process from the model to the finished product. The present invention, combined with computer control, presents the capability of not only developing a pattern from a model but providing the entire system of graded patterns at one time. Face and body contours of human beings may be conveniently reduced to numerical form for comparison by computer for rapid identification, similar to the manner in which fingerprint identification is currently achieved.

The present invention permits the accurate measurement of objects which cannot be physically contacted for that purpose. In wind tunnel tests, for example, any intrusion of deflection measuring devices often significantly alters the conditions under which the measurements are made. The present invention permits the surface contour of the wind tunnel model to be continually monitored from outside the wind tunnel to provide a record of dimensional instabilities and deviations occurring just before the model disintegrates.

The present invention provides the capability of monitoring wear on precision bearing surfaces, even while the bearings are in operating use. This is, of course, accomplished without any interference of the operation of the equipment. Thus, such a system may provide an indication of potential failure before the equipment reaches the failure point. Similarly, systems equipped with the present invention may be employed for quality control inspection on production lines, literally permitting 100% inspection "on the fly" without having to pull products off the line for spot checking and other tests.

Although the present invention is applicable to a variety of uses, of which the above examples are only a small sample, it will be shown and described herein in accordance with its application in the automotive design field. However, it should be understood that it is not to be limited thereto.

BRIEF DESCRIPTION OF THE DRAWINGS

A better understanding of the present invention may be had from a consideration of the following detailed description, taken in conjunction with the accompanying drawings, in which.

DESCRIPTION OF THE PREFERRED EMBODIMENTS

Figure 1:
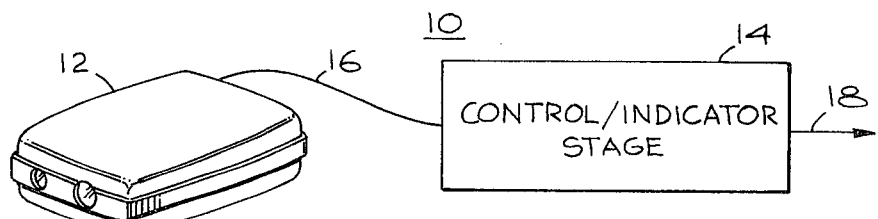
FIG. 1 is a diagrammatic representation of one particular arrangement in accordance with the invention.

FIG. 1 illustrates one particular arrangement in accordance with the invention comprising a probe or head 12 and a control/indicator stage 14. The two portions are connected by a suitable electrical cable 16 and the control/indicator stage 14 provides an output on a lead 18, which may indicate a plurality of output leads together. It may also include an indicator calibrated in units of distance for providing a direct reading of distance to the target from the probe 12.

Figure 2:
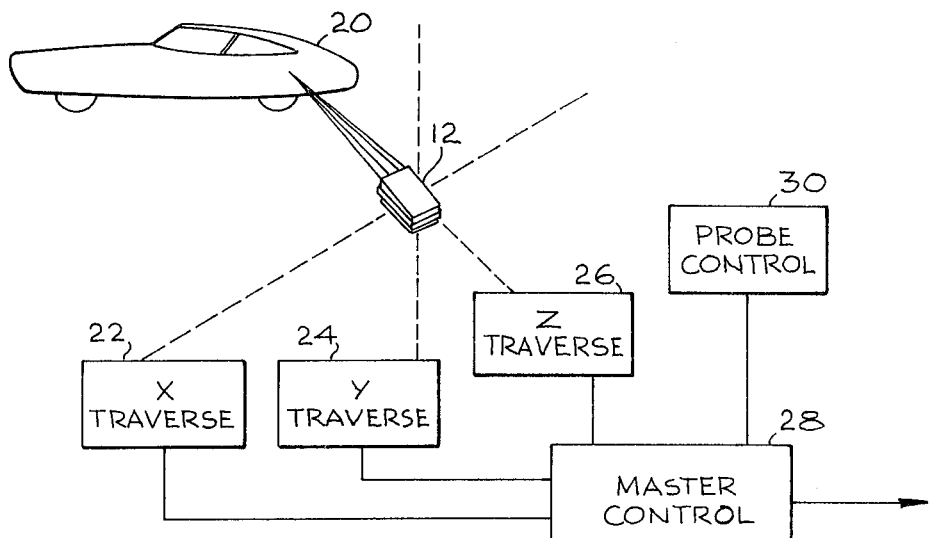
FIG. 2 is a block diagram illustrating the use of the arrangement of FIG. 1 in one particular application.

FIG. 2 illustrates one particular system in which the arrangement of FIG. 1 may be employed, and shows the probe 12 set up in a control system to scan a particular target in the form of an automobile design 20. In this particular application, it is contemplated that the movement of the probe 12 is controlled along three Cartesian coordinate axes by means of an X-traverse stage 22, a Y-traverse stage 24 and a Z-traverse stage 26, all coupled to a master control stage 28. In a preferred arrangement of this type, as the traverse stages 22, 24 and 26 determine the movement of the probe 12 in its scan of the model 20, the position signals are transmitted to the master control stage 28, along with output signals from the probe 12 derived via a probe control stage 30. The master control stage 28 provides an output which is in a numerical form suitable for storage in a computer or for control of automatic machines. The probe control stage 30 may comprise the control/indicator 14 as in FIG. 1, or it may be of a more sophisticated design for controlling the probe 12 during its traverse in the scanning process.

Figure 3:
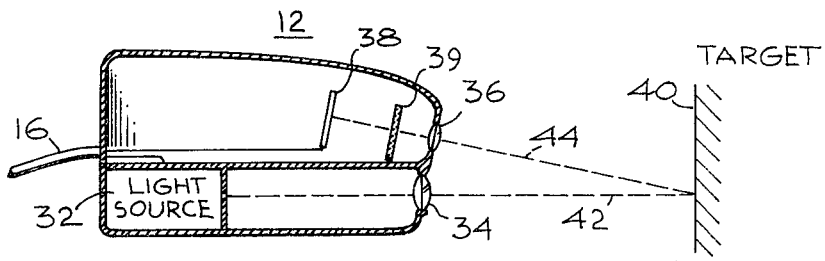
FIG. 3 is a sectional view of a portion of the arrangement of FIG. 1.

One particular construction of the probe 12 is shown in the sectional view of FIG. 3 as comprising a light source 32, a projection lens 34, a receiver lens 36, and a photodetector 38. The entire enclosure, including the partition between the project and receiver portions of the probe 12, is of course light-tight except for the lenses 34 and 36. In addition to those elements which have been mentioned, the receiver portion of the probe 12 may also include a light filter 39 between the receiver lens 36 and the photo detector 38.

In operation, the probe 12 is placed opposite a target 40. The operation of the probe 12 is based upon triangulation. The light source 32 is utilized to form a small intense spot of light for projection. The light source 32 is placed along the projection optical axis represented by the dashed line 42 and is normally positioned so that the projection optical axis 42 is normal to the target 40, or at least is normal to some particular reference plane thereof for the zero angle position. The projection lens 34 collects the radiated light of the light source 32 and focuses it at the zero setting position of the target 40. Reflected light, directed along the received light axis represented by the dashed line 44, is gathered by the receiver lens 36 and is then directed toward a bicell photo-detector 38, through an optional filter 39 if the latter is included. When used, the filter 39 serves to inhibit ambient light from reaching the detector 38. In the arrangements shown in FIG. 3, the filter 39 is typically a high-pass filter with the light source 32 comprising zirconium arc lamp. The bicell detector 38 is mounted with its center located on the receiver optical axis 44.

Translatory motion of the target relative to the projection lens 44 results in motion of the received spot across the bicell detector 38. A signal proportional to the motion is thus generated when the bicell outputs are differenced. Inherent scale factor changes due to variations in the target material, target angle and target motion are automatically compensated for in associated data processing electronic circuitry of the control/indicator stage 14. Thus, the probe 12 and its related circuitry are usable over a wide range of target materials, including paper, cardboard, wood, plaster, clay, painted surfaces, plastic, metals, and the like which present both a wide variation in material and in surface roughness. The only requirement is that the surface be at least partially optically diffuse in nautre. Materials of relatively high specular quality can be measured directly over an incident angle of a 90° solid cone centered on the projection optical axis. This includes materials which vary by as much as 30:1 over the indicated angular range. The principal variable in the configuration of the sensor probe 12 as shown in FIG. 3 is the light source 32. This may assume several forms dependent upon the specified probe size and weight, and the specified projected spot diameter. The light source 32 may be a zirconium concentrated arc lamp. A zirconium concentrated arc lamp yields an acceptably small spot size for most measurement applications.

Figure 4:
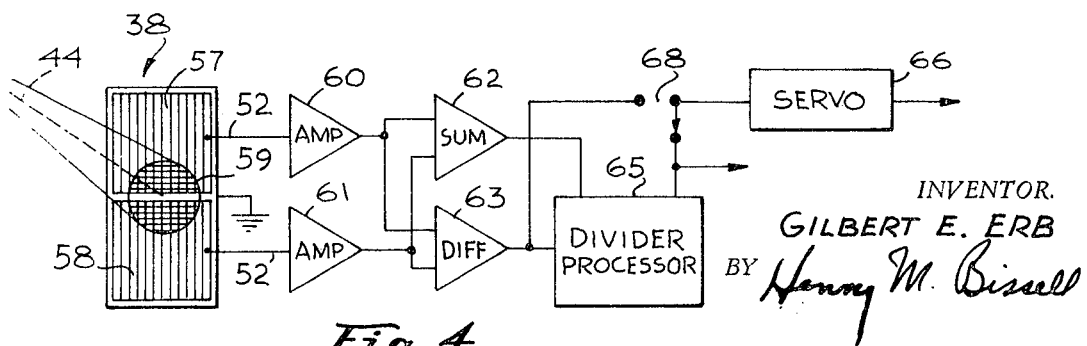
FIG. 4 is a block diagram of one particular circuit arrangement in accordance with the invention.

Particular circuitry providing an operating system in accordance with the invention is shown in FIG. 4. In this figure, the bicell 38 of the probe 12 of FIG. 3 is shown receiving light along an axis 44. A spot of light 59 is developed on the bicell 38. The bicell 38 is depicted in FIG. 4 as having output leads 52 connected to the separate inputs of respective amplifiers 60 and 61. The leads 52 take signals from separate photoresponsive films 57 and 58 of the bicell 38, which signals correspond to the extent and intensity of the light incident thereon. Signals from the amplifiers 60 and 61 are applied to a summing stage 62 and a difference stage 63. The outputs of the stages 62 and 63 are applied to a divider processor 65 which may include a ratio network and automatic gain control circuitry (AGC) as is known in the art. A servo stage 66 is shown for optional connection via a switch 68. The ouptut of the stage 66 may be applied to the master control 28 to control the Z traverse 26 (FIG. 2) in response to null signals from the control/indicator stage 14 (FIG. 1). The servo stage 66 when used may be connected to the output of the divider processor 65 or alternatively to the output of the difference stage 63, in which case the summing stage 62 and the divider processor 65 may be eliminated from the system. With the servo 66 in use, a deadband light may be included in the control/indicator 14 (FIG. 1) to indicate when the null position of the unit is within an acceptable range.

The operation of systems in accordance with the present invention may be described in terms of the circuit arrangement represented in FIG. 4. Let the operating parameters be defined as follows:

$K_1$, $K_2$ = gain of amplifier stages 60, 61 respectively.
$K_{01}$, $K_{02}$ = gain of the bicell films 58, 59 respectively.
$k$ = target reflectivity.
$M$ = total radiated power.
$P_1$ = transmitter efficiency.
$P_2$ = receiver efficiency.
$A_1$, $A_2$ = illuminated bicell areas of films 58, 59 respectively.

Then
$$E_{sum} = MP_1kP_2(K_1K_{01}A_1 + K_2K_{02}A_2) \quad (1)$$

$$E_{diff} = MP_1kP_2(K_1K_{01}A_1 - K_2K_{02}A_2) \quad (2)$$

The scale factor of the amplifiers 60, 61 may be made equivalent and stable to any required tolerance, dependent upon the choice of operational amplifier and summing resistors. The bicell gain for both sides will be equal for materials which are symmetrical across the measurement spot as a result of the manufacturing process employed by which both films 57 and 58 are laid down together. Therefore $K_1 = K_2 = K$ and $K_{01} = K_{02} = K_0$. This permits simplification of Equations 1 and 2 as follows:

$$E_{sum} = MP_1kP_2KK_0(A_1 + A_2) \quad (3)$$

$$E_{diff} = MP_1kP_2KK_0(A_1 - A_2) \quad (4)$$

The divider processor 65 is arranged to divide $E_{diff}$ by $E_{sum}$ and effectively removes the large scale factor changes associated with the products indicated in Equations 3 and 4. The result eliminates the product $$MP_1kP_2KK_0$$

and provides the following result:

$$\frac{E_{diff}}{E_{lum}} = \frac{A_1 - A_2}{A_1 + A_2} \quad (5)$$

Thus only the ratio of illuminated areas is significant; symmetrical compression or elongation is not critical. The large errors normally associated with target reflectivity and target distance are removed by the linearization process of the circuitry of FIG. 4 as represented by Equation 5.

Certain errors inherent in the operation of the bicell 38 may be eliminated by zeroing the cell output circuitry so as to make $A_1 = A_2$ for the center position. In this fashion, a symmetrical reading may be developed which is linear and is accurately related to target motion over the linear measurement range. Such a method is theoretically exact and is satisfactory in most fixed applications, especially where mechanical distance calibration may be performed. The divider processor may comprise an AGC network for limited conditions, such as in an analog output system, and where increased errors are permissible. Because only the ratio of the illuminated areas of the films 57, 58 is important, the sum and difference signals developed in the stages 62 and 63 may be automatically or manually gain-normalized to optimize the divider dynamic range.

As thus described, a typical scanning operation involves a repetitive traversal of the field within a plane normal to the projection axis (which is usually the Z axis). An alternative mode of operation involving the servo stage 66 utilizes the servo stage 66 to control the position of the probe 12 along the projection axis (usually the Z axis) with a Z axis readout being provided from the Z traverse stage 26 and the master control stage 28 (FIG. 2) as the output information. The system is set to maintain a fixed distance of the probe from the surface being scanned and the servo 66 operates in conventional fashion to reduce the error signal detected relative to the reference distance. The instantaneous error signal may be displayed on a null indicator in the control/indicator stage 14 (FIG. 1) which also includes a null indicator light or other signalling device (deadband signal) to audibly or visually signal an operator when the system is operating within a preselected threshold range of the true zero null position. Such a deadband signal may also be used to control the output information signal path via a gate, for example, to block all Z position signals corresponding to null indications outside the preselected threshold range, if desired.

Arrangements in accordance with the invention as described hereinabove are effective in performing noncontact measurements of a design model configuration or of other devices for which point by point measurements are desired to provide digital output signals designating the locations of the various points making up the model in terms of Cartesian coordinates. Systems in accordance with the invention are particularly useful by virtue of the precise and repeatable measurements which may be made without touching or affecting the surface of the model being measured. These systems also permit data collection activities to be automated with a corresponding decrease in the time required to perform measurements. In addition to the uses described for the invention, embodiments thereof are widely applicable for other purposes, such as centerless grinder monitoring, drill and mill control, sheet stock thickness gaging, fixed tool checking, quality control, visual timing operations, and the like.

Although there have been described above specific arrangements of a non-contacting optical probe in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. An optical scanning system for providing distance measurements to a target object being scanned without physical contact therewith comprising:
   a light source for projecting light at a target;
   a photodetector for developing electrical signals in accordance with reflected light received from said target, said photodetector being divided into a plurality of active areas with each active area developing an electrical signal in accordance with the portion of the reflected light incident thereon;
   electrical circuitry connected to said photodetector for developing comparison signals from the individual active area electrical signals; and
   means for processing said comparison signals to provide an output signal indicative of the distance from the photodetector to the target.

2. A system in accordance with claim 1 further including an indicator responsive to said output signal and calibrated in units of linear measurement for directly indicating said distance in said units.

3. A system in accordance with claim 1 wherein the photodetector comprises a cell having a pair of separate active areas substantially equal in extent and symmetrically located thereon; and
   means for directing the reflected light in a beam to be substantially equally shared by said pair of active areas at a predetermined reference distance from the target.

4. A system in accordance with claim 3 wherein said light directing means is positioned to direct the reflected light beam off the center of said separate active areas for distances between the cell and the target which are different from said reference distance.

5. A system in accordance with claim 1 wherein said electrical circuitry comprises a first amplifier connected to provide a first comparison signal which is the sum of the electrical signals from the detector and a second amplifier connected to provide a second comparison signal corresponding to the difference between the electrical signals from the detector.

6. A system in accordance with claim 5 wherein said processing means includes a signal dividing circuit for developing an output signal which is equal to the difference divided by the sum of the signals from the detector.

7. A system in accordance with claim 5 wherein said processing means includes automatic gain control circuitry for controlling the amplitude of the difference signal in accordance with the amplitude of the sum signal.

8. A system in accordance with claim 6 wherein said output signal is approximately equal to $$\frac{A_1-A_2}{A_1+A_2}$$

where $A_1$ and $A_2$ correspond to the illuminated portions of the separate active areas respectively.

9. A system in accordance with claim 1 further including an optical filter positioned between the photodetector and the target for reducing the extent of interfering light at the photodetector.

10. A system in accordance with claim 9 wherein said optical filter is arranged to block ambient light from reaching the photodetector.

11. A system in accordance with claim 4 further including traverse means for controlling relative motion between the photodetector and the target object.

12. A system in accordance with claim 11 wherein said processing means comprises a servomechanism responsive to the difference between the active areas of said detector illuminated by the light beam in order to control the traverse along a selected axis to minimize said difference.

13. A system in accordance with claim 12 wherein said processing means further includes a signal dividing circuit for driving the servomechanism in accordance with the ratio of the difference divided by the sum of the detector signals.

14. A system in accordance with claim 1 further including a deadband signal for indicating when the position of the photodetector is within a preselected threshold range of its true position.

References Cited

UNITED STATES PATENTS

| | | | |
|---|---|---|---|
| 3,473,875 | 10/1969 | Bertram | 356—2 |
| 3,481,672 | 12/1969 | Zoot | 356—5 |

FOREIGN PATENTS

| | | | |
|---|---|---|---|
| 728,860 | 3/1966 | Canada | 356—1 |

OTHER REFERENCES

Beck et al., "Surface Analysis," IBM Tech. Disclosure Bulletin, May 1970, vol. 12, No. 12, pp. 2335–2337.

RODNEY D. BENNETT, JR., Primary Examiner

S. C. BUCZINSKI, Assistant Examiner

U.S. Cl. X.R.

356—1, 2, 167